United States Patent [19]

Lochmann

[11] Patent Number: 5,346,179
[45] Date of Patent: Sep. 13, 1994

[54] GALLING RESISTANT FLEX-SEAT FOR GATE VALVES

[75] Inventor: Bernhard Lochmann, Oklahoma City, Okla.

[73] Assignee: FMC Corporation, Chicago, Ill.

[21] Appl. No.: 57,138

[22] Filed: May 5, 1993
(Under 37 CFR 1.47)

[51] Int. Cl.⁵ .................................. F16K 3/00
[52] U.S. Cl. ........................ 251/328; 251/359
[58] Field of Search .................... 251/328, 359

[56] References Cited

U.S. PATENT DOCUMENTS

| | | | |
|---|---|---|---|
| 4,208,035 | 6/1980 | Alvarez et al. | 251/328 X |
| 4,471,943 | 9/1984 | Nelson | 251/328 X |
| 4,645,179 | 2/1987 | Ali | 251/328 X |

*Primary Examiner*—John C. Fox
*Attorney, Agent, or Firm*—H. M. Stanley; R. C. Kamp; R. B. Megley

[57] ABSTRACT

A valve seat member in a gate valve has a circular or crescent shaped slot cut on the inside diameter parallel to and underneath the seat surface to create a seat with increased flexibility at areas on the seat surface where high compressive stress during valve operation is observed. As a result galling of the gate is reduced, and valve reliability and life are increased.

4 Claims, 2 Drawing Sheets

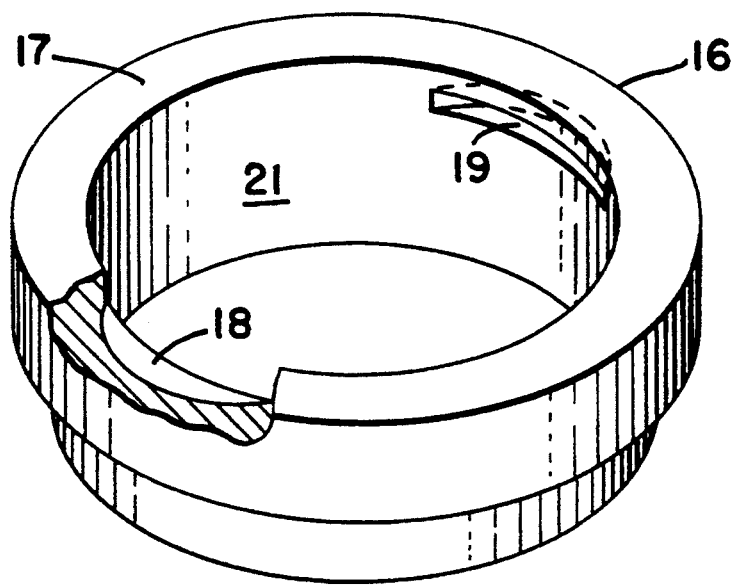
FIG_1
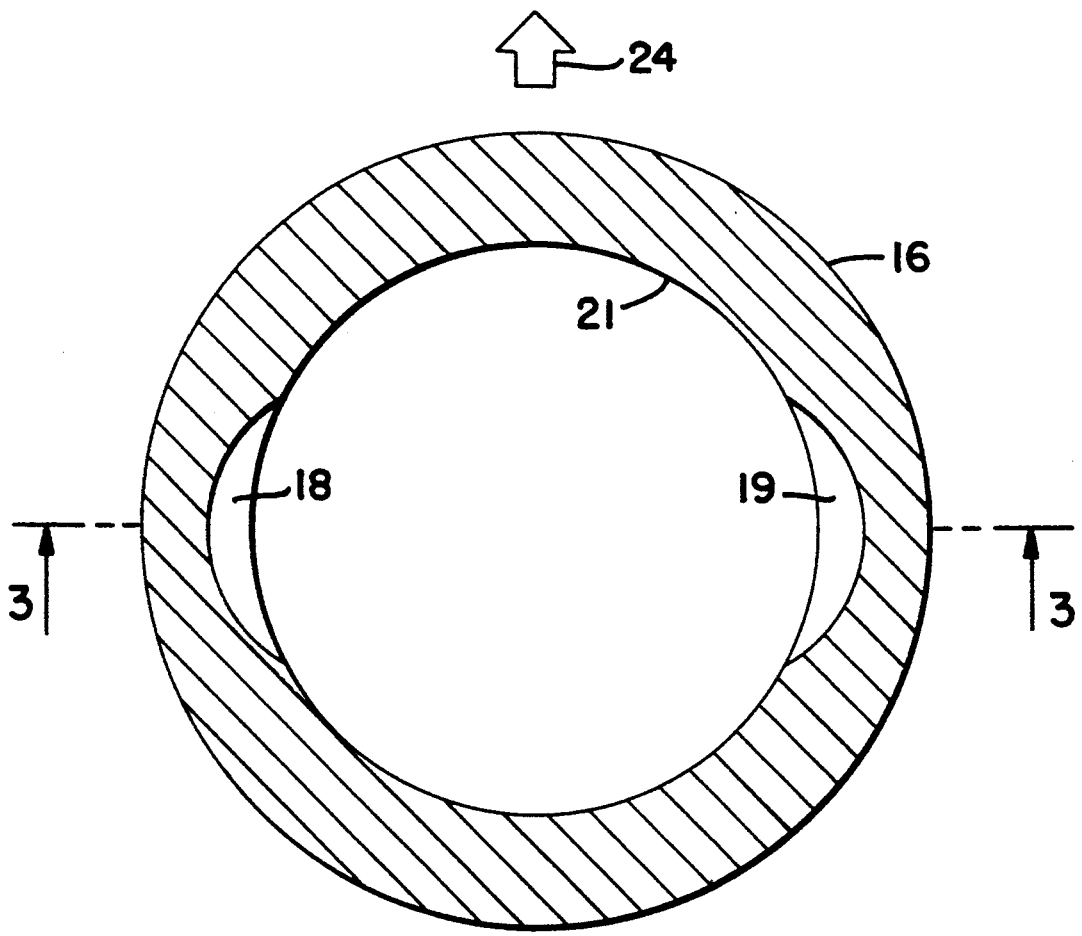
FIG_2

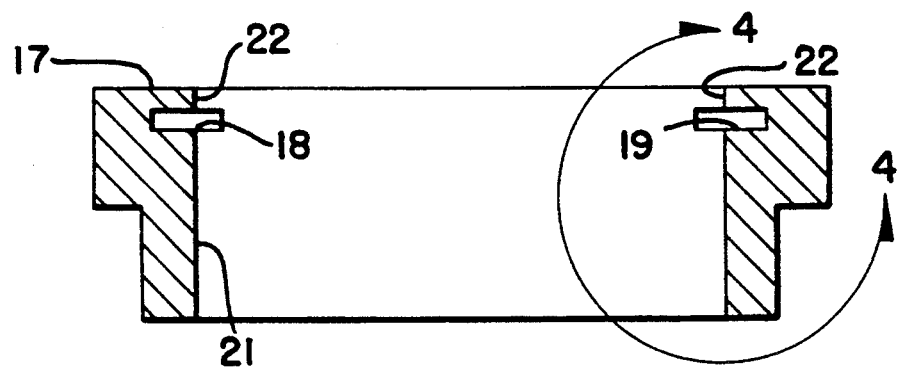
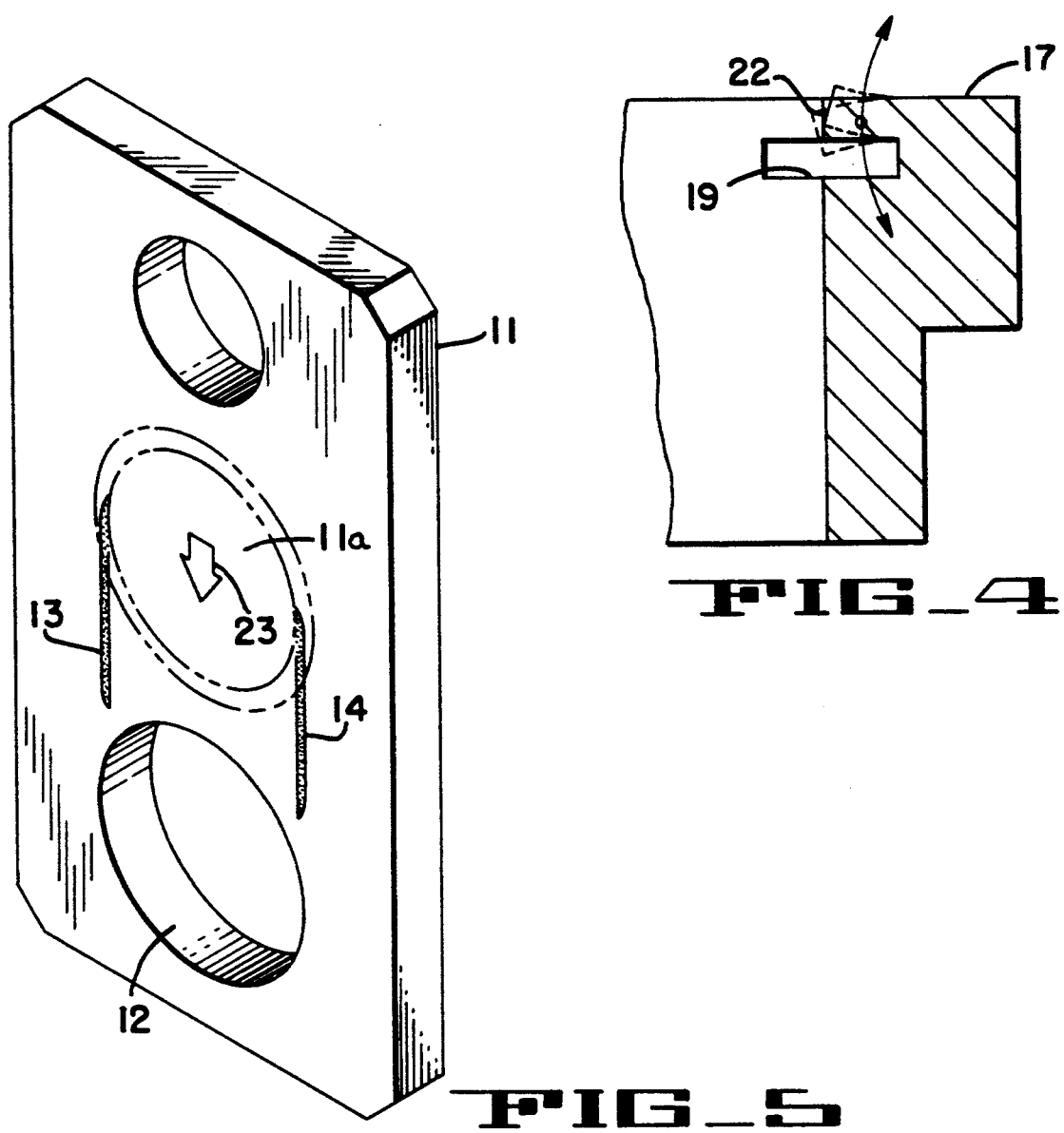

GALLING RESISTANT FLEX-SEAT FOR GATE VALVES

SUMMARY OF THE INVENTION

A galling resistant valve seat for a gate valve has been developed which includes a valve seat member having a valve seat surface and an inside diameter for surrounding a flow path. The inside diameter has at least one slot adjacent parallel to and spaced from the valve seat surface so that valve seat surface area flexibility is increased in the valve seat surface adjacent the slot and valve gate galling is thereby minimized.

A gall resistant gate valve has a valve seat member having an annular valve seat surface and a valve gate for movement relative to the valve seat surface whereby valve gate movement alternately provides an open and a closed valve condition. The valve seat member has a cavity formed therein adjacent to and spaced from the annular valve seat surface, so that compressive stress between the valve seat surface and the valve gate is reduced in the region of the cavity.

BRIEF DESCRIPTION OF THE DRAWINGS

FIG. 1 is a perspective view of the annular valve seat of the present invention with the seat partially broken away.

FIG. 2 is a section through the valve seat parallel to and removed from the valve seat surface.

FIG. 3 is a section along line 3—3 of FIG. 2.

FIG. 4 is a section of detail 4 of FIG. 3.

FIG. 5 is a perspective view of a valve gate used in conjunction with a valve seat without benefit of the present invention.

DESCRIPTION OF THE PREFERRED EMBODIMENT

A typical gate valve consists of a sliding gate which is disposed between a valve open and a valve closed position in cooperation with a valve seat for the purpose of alternatively allowing fluid flow past the valve or shutting off fluid flow at the valve. In the past it has been discovered that their are distinctive areas on the gate of the gate valve where galling of the metal gate has occurred. FIG. 5 shows such a gate 11 which is slid in the direction of the long dimension of the gate to alternatively block fluid flow when the central portion 11a of the gate is disposed adjacent the valve seat and to allow fluid flow past the valve when a valve gate opening 12 is disposed adjacent the valve seat. A valve seat is an annular member disposed surrounding a flow path through the valve and adjacent the valve gate for cooperation with the gate to alternately block and pass fluid at the valve as described hereinbefore. The valve seat to be used in conjunction with the gate has caused galling of the gate as hereinbefore described, wherein the galled areas on the gate 11 appear as "gall tracks" depicted at 13 and 14 in FIG. 5. The annular valve seat of the present invention is shown in FIG. 1 at 16 wherein, as previously described, the valve seat surrounds the fluid flow path. The contact surface of the valve seat is seen as surface 17 in FIG. 1. Opposing crescent shaped undercuts 18 and 19 are made parallel to and spaced from the contact surface 17. The undercuts 18 and 19 form cavities adjacent to and displaced from the valve seat surface 17 and the crescent-like shapes thereof are more readily observed in FIG. 2 of the drawing wherein a section through the undercuts in the valve seat member 16 is shown. As mentioned hereinbefore, the valve seat member surrounds the flow path and therefore forms part of the flow path at the inside diameter 21 thereof.

An additional depiction of the undercuts 18 and 19 in the valve seat member 16 is shown in FIG. 3. The undercuts or cavities form a lip 22 between the undercuts and the valve seat surface 17. The purpose of the undercuts 18 and 19 is to produce greater flexibility at the valve seat surface 17 in the portion of the valve seat which experience has shown, in interaction with the valve sliding gate, the "gall tracks" 13 and 14 of FIG. 5 occur. The flexibility of the lip 22 of the valve seat is shown in exaggerated fashion in the detail of FIG. 4. The friction force on the valve gate 11 is depicted by the arrow 23 in FIG. 5 as the friction force resists the force exerted to move the gate 11 upward in FIG. 5 to an open position. The friction force at the valve seat surface 17 is illustrated by the arrow 24 in FIG. 2 as that force resists the sliding of the gate 11 from the closed to the open position. It is thought that the galling represented by the lines 13 and 14 of FIG. 5 occurs primarily during the movement of the gate from the closed to the open position when there is minimal lubrication between the valve seat 17 and the gate 11 and because the valve seat 16 is deformed somewhat ellipically during gate movement in either direction. There appears to be a distinct area on the valve seat surface 17 which is microscopically raised as the somewhat elliptical deformation occurs, wherein these distinct areas appear to be at the sides of the seating surface 17 relative to the movement between the gate 11 and the valve seat 16. As a result, compressive stress is increased between the sides of the valve seat 17 and the sliding adjacent surface of the gate 11 to a point exceeding the galling stress of the gate material, thereby causing decrease in gate valve service life and valve leakage.

The recognition of the foregoing characteristics observed in the interaction between standard valve gates and valve seats led to the invention described herein, wherein the valve seat 16 in the area of the aforementioned raising due to elliptical valve seat deformation is rendered more flexible by the undercuts 18 and 19. The flexibility as illustrated in FIG. 4 of the drawings reduces the compressive stresses at the sides of the valve seat and the gate 11 whereby galling is substantially eliminated, valve leakage characteristics are improved and valve life is lengthened.

Galling stress for tungsten carbide spray overlaid hardfacing valve pans is about 200,000 pounds per square inch. Peak compressive stresses are estimated to be up to 300,000 pounds per square inch in actual applications. It is estimated that these peak compressive stresses at the sides of the valve seating surface 17 (positioned laterally relative to valve gate motion direction) may be lowered by a factor of 3 by cutting a cavity such as the circular slots 18 and 19 under the seat surface at the seat areas of high stress to create a seat section at the high stress areas with increased flexibility. In this manner, it is considered that the peak compressive stress using the valve seat member with the undercut cavities slots as disclosed herein will stay well below the galling stress and valve integrity and life will be considerably expanded.

Although the best mode contemplated for carrying out the present invention has been herein shown and described, it will be apparent that modification and variation may be made without departing from what is regarded to be the subject matter of the invention.

What is claimed is:

1. A galling resistant valve seat for a gate valve having a valve gate for motion between valve closed and valve open positions, comprising
    a valve seat member having a valve seat surface and an inside diameter for surrounding a flow path,
    said inside diameter having at least one slot cut along a limited portion thereof, said slot being positioned adjacent to and spaced from said valve seat surface, whereby valve seat surface flexibility is increased in the valve seat surface area adjacent to said slot and valve gate galling is thereby minimized.

2. A galling resistant valve seat as in claim 1 wherein said at least one slot comprises opposing slots cut along limited portions of said inside diameter, said slots being cut parallel to said valve seat surface and being located laterally on said valve seat member relative to the direction of valve gate motion.

3. A gall resistant gate valve having a flow path therethrough, comprising
    a valve seat member having an annular valve seat surface and an inside diameter forming a part of the valve flow path,
    a valve gate for movement relative to said valve seat surface so that valve gate movement alternately provides an open and a closed flow path condition,
    said valve seat member inside diameter having at least one cavity formed therein, said at least one cavity extending along a portion only of said valve seat member inside diameter, said cavity further being positioned adjacent to and spaced from said annular valve seat surface, whereby compressive stress between said valve seat surface and said valve gate is reduced in the region of said cavity.

4. A gall resistant gate valve as in claim 3 wherein said at least one cavity comprises first and second slots in said valve seat member inside diameter extending along a portion only thereof and being disposed thereon laterally of the direction of gate movement.

* * * * *